United States Patent [19]

Sample et al.

[11] Patent Number: 4,668,158

[45] Date of Patent: May 26, 1987

[54] SHEET STACKING AND TRANSFERRING DEVICE

[75] Inventors: Charles A. Sample, Green Bay; Ronald L. Lotto, Bonduel, both of Wis.

[73] Assignee: FMC Corporation, Chicago, Ill.

[21] Appl. No.: 909,731

[22] Filed: Sep. 22, 1986

Related U.S. Application Data

[62] Division of Ser. No. 749,248, Jun. 27, 1985.

[51] Int. Cl.[4] .......... B65G 57/08

[52] U.S. Cl. .......... 414/786; 198/644; 198/692; 271/196; 414/27; 414/72

[58] Field of Search .......... 414/27, 43, 50, 69, 414/72, 80, 81, 737, 786; 271/90, 83, 89, 175, 195, 196, 218, 314, 315, 903; 493/204, 926; 198/644, 692, 693; 901/40

[56] References Cited

U.S. PATENT DOCUMENTS

| | | | |
|---|---|---|---|
| 3,125,916 | 3/1964 | Hayes et al. | 271/83 X |
| 3,625,338 | 12/1971 | Cawley | 414/27 X |
| 3,921,827 | 11/1975 | Joice | 414/72 |
| 4,019,640 | 4/1977 | Marin et al. | 271/218 X |
| 4,262,897 | 4/1981 | Kopacz | 271/175 X |
| 4,270,908 | 6/1981 | Lehmacher | 493/204 |
| 4,357,126 | 11/1982 | Kidd et al. | 271/218 X |
| 4,436,472 | 3/1984 | Kunzmann | 271/218 X |

*Primary Examiner*—Leslie J. Paperner

*Attorney, Agent, or Firm*—Douglas W. Rudy; Raymond E. Parks; Richard B. Megley

[57] ABSTRACT

Disclosed is a rotary vacuum arm bag or sheet transferring and stacking device and a stack-handling system enabling an indexing of counted bag stacks. The transferring device grasps and retains the bags adjacent margins transverse to the direction of web advance while at least a portion of the opposed margins parallel to such direction are spaced inwardly from the arms to define a slot or gap thru which stack-retaining fingers project contributing to remove a bag from a pair of arms and retaining the bag in a stack wherein respective margins overlie each other. Also disclosed is a stack-handling system having the ability to remove a completed stack from the stacking station and yet allow, if desired, continuous bag machine operation and, as a result, uninterrupted transfer of sheets or bags to the stacking stations.

1 Claim, 23 Drawing Figures

FIG_4
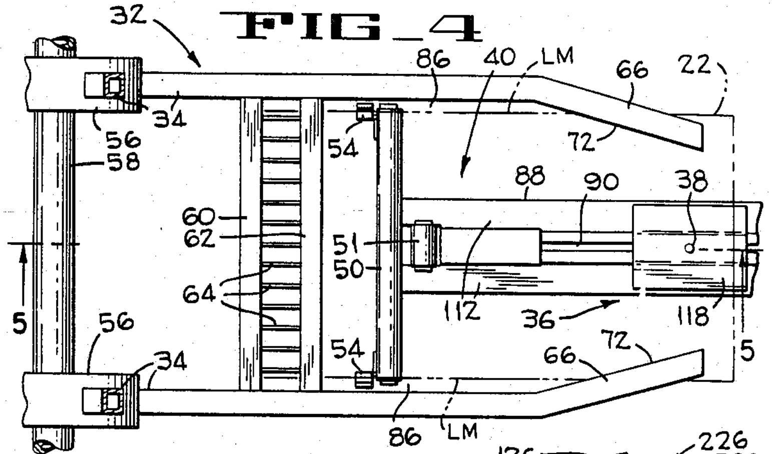
FIG_5
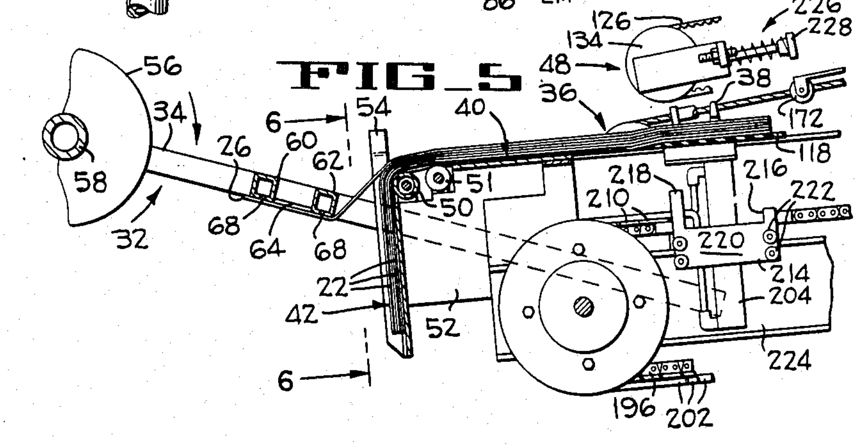
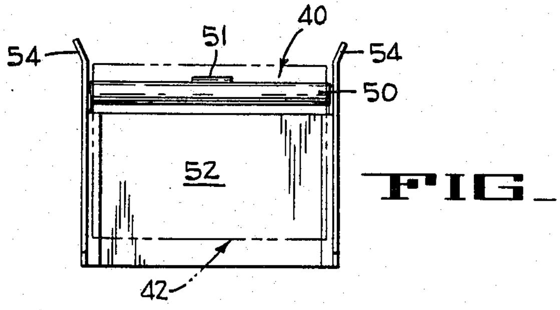
FIG_6

FIG_7
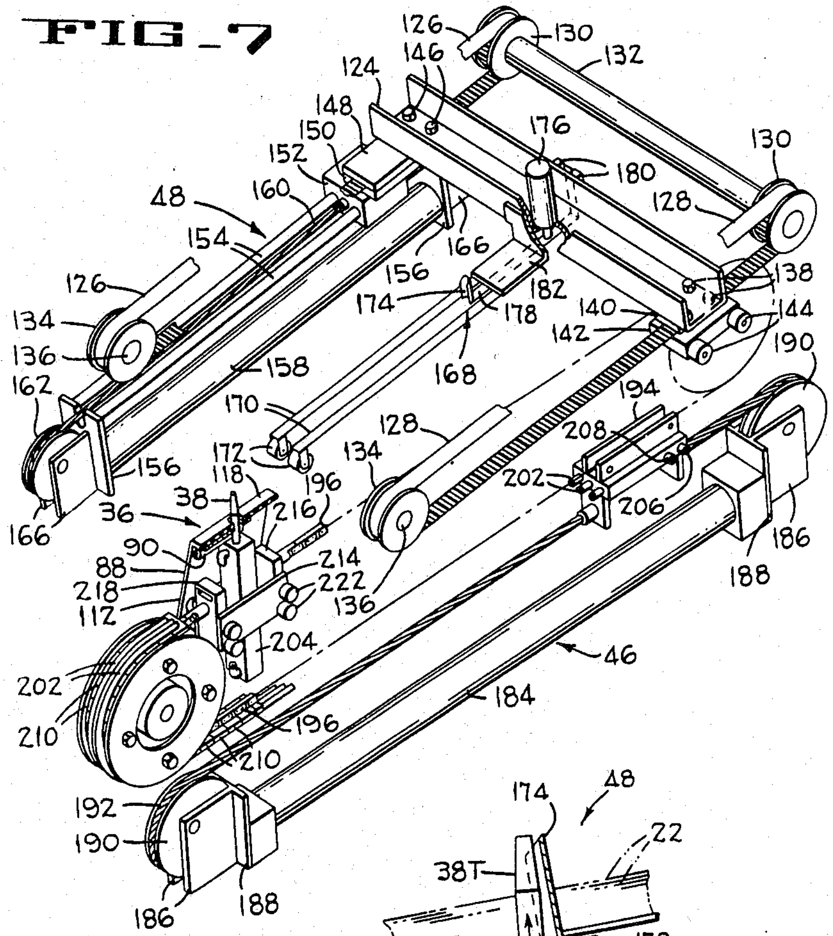
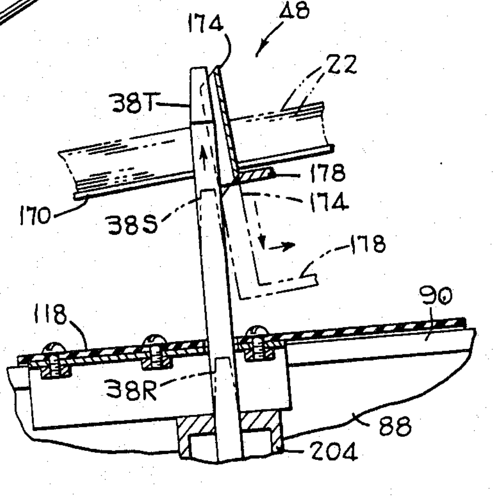
FIG_8

SHEET STACKING AND TRANSFERRING DEVICE

This is a division of application Ser. No. 06/749,248, filed June 27, 1985.

This invention relates to the manufacture of thermoplastic sheets and more particularly to apparatus and methods for producing, stacking and handling stack of sheets or bags produced therefrom.

Of the patented prior art relevant to certain aspects of the present invention reference is made to the U.S. patents to L. Maccherone U.S. Pat. No. Re. 27,523, D. C. Crawford U.S. Pat. No. 4,386,924 and R. De Bin U.S. Pat. No. 4,451,249 and the reference cited therein.

One type of a bag that can be made by practicing the present invention is known as a grocery bag having hand grasping or arm receiving loops made by cutting a gusseted 2-ply sheet of thermoplastic material. More specifically the sheet is cut at one end so that a portion of the inner creases of the opposed gussets are cut. It is conventional to cut a U-shaped portion from one end of the sheet. A bag taking this form is also referred to as a T-shirt bag, since its general configuration resembles such an item of clothing.

A variety of approaches are used to produce T-shirt or grocery bags. One approach involves transporting successive pieces of gusseted tubular thermoplastic material, sealed at both ends with the sealed ends being transverse to the direction of feed, to a device for cutting from each piece, a U-shaped portion from the leading portion of the web.

Another approach stacks a group of web segments sealed at both ends against an abuttment overlying a flat horizontal surface, which may be an indexable conveyor, to produce a stack wherein corresponding margins overle each other. The stack may be provisionally unified by plunging a hot pin through a selected region of the stack and, either mechanically or by hand, introducing a cutting apparatus for cutting out a U-shaped portion to produce hand gripping loops.

BRIEF DESCRIPTION OF THE DRAWINGS

FIG. 4 is a partially enlarged view of the rightward pair of vacuum arms shown in FIG. 2 depositing a sheet at the stacking station.

FIG. 5 is an elevation of FIG. 4 taken substantially along the line 5—5 of FIG. 4.

FIG. 6 is an end elevation of FIG. 5 as projected in a plane 6—6 of FIG. 5.

FIG. 7 is a perspective illustrating a provisional or temporary stack accumulating mechanism and a mechanism for indexing a completed stack from the stacking station.

FIG. 8 is an enlarged detail illustrating the relationship of posts that cooperate to effect uninterrupted stacking of web segments at the stacking station.

DESCRIPTION OF THE PREFERRED EMBODIMENT

Figure 1:
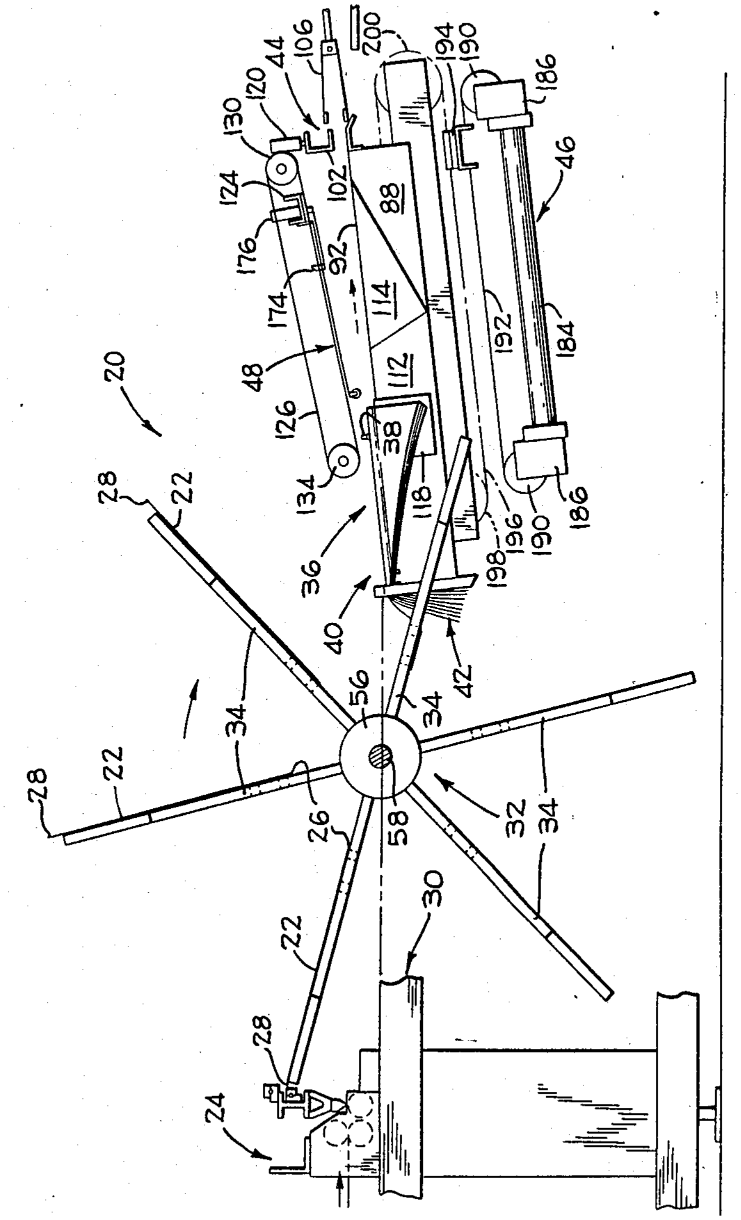
FIG. 1 is an elevation showing a portion of a conventional bag machine and a vacuum arm transfer and stacking device transporting successive sheets to an accumulating device.

The sheet transferring and stacking device incorporating the principles of the present invention is shown in FIG. 1 and it is generally indicated by the number 20. Gusseted 2-ply sheets of tubular thermoplastic sheets 22, produced by a conventional bag machine 24, are sealed along a leading margin 26 and a trailing margin 28. Successive sheets are deployed on a support 30 of conventional construction. Immediately after a sheet is deployed on the support 30 it is grasped by a transferring and stacking device 32 rotating in a clockwise direction (as viewed in FIG. 1). The device 32 includes a plurality of pairs of radially extending circumferentially spaced arms 34 which are connected, in a conventional manner, to a source of a vacuum operating through a plurality of aperatures in the arms to grasp the sheets and transfer them to the stacking station 36 which may include a post or pin 38 cooperating with retaining means 40 to develop a registered stack of web segments 42 at the stacking station. As used herein, registered stack of web segments refers to the condition whereby corresponding margins of successive sheets substantially overlie each other.

On accumulating a predetermined number of sheets in a stack, which may be accomplished by use of conventional electronic counters, the stack 42 is transported in the direction indicated by the arrow, to a clamping device 44 by a transversing or indexing mechanism 46. Immediately prior to the actuation of the transversing mechanism 46 a temporary sheet retaining, means 48, are rendered operable to accumulate a selected number of web segments of a successive stack while the previously completed stack is moving toward the clamping device 44.

In view of the above brief description of the general arrangement of the preferred components it should be realized that the transferring and stacking device 32 grasps and retains thermoplastic sheets as they are deployed on a support 30 and transfers them in an arcuate path to a stacking station 36 wherein each sheet is retained in a stack 42 by a pin or post 38 and a transverse support, such as a roller 50, (FIG. 2) which may be associated with retaining means 40. When a selected number of sheets have been accumulated, the preliminary accumulating means 48 is rapidly projected in the path of the sheets to provisionally create a stack while the completed stack is being displaced toward the clamping device 44.

Figure 2A:
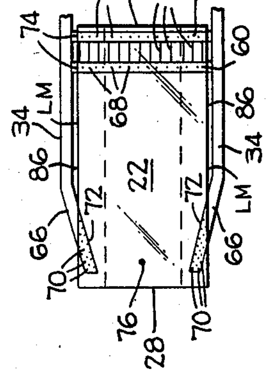
FIG. 2A is a partial view of the leftward vacuum arms shown in FIG. 2 carrying a web segment.
Figure 2:
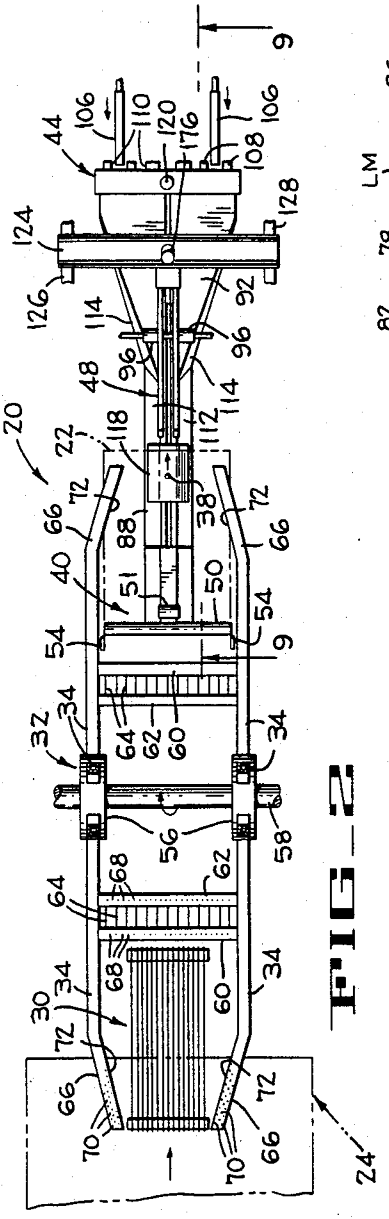
FIG. 2 is a partial plan of FIG. 1 illustrating a preferred configuration and construction of the vacuum arms and their relationship to the bag machine and a stacking station.

FIGS. 2 and 2A illustrate a preferred configuration of the radial arms 34 as they relate to transfering a sheet 22 to the stacking station 36 including the post or pin 38. The retaining means 40 essentially comprises the transverse roller 50 rotatably mounted between upwardly extending supports 52 (FIG. 3) formed with upwardly extending slightly flared retaining fingers 54. Accordingly, each tubular sheet 22 in the stack is retained by the pin 38 and retaining fingers 54 at the opposed ends of the transverse support roller 50.

The sheet transferring and stacking device 32 comprises hollow hubs 56 fixed on a shaft 58 which is rotated by any suitable means. Each of the radial arms 34 is hollow and in communication with the interior chamber of the hubs 56. Additionally, the arms are rigidly connected to the hubs 56 and are interconnected by hollow transversely extending bars 60 and 62 which are in communication, through the arms 34, to the hollow hubs 56. A screen or a plurality of rods 64 are connected to and extend between the bars 60 and 62 and provide a backing support for a sheet 22 during its passage to the stacking station 36.

Each of the hollow radial arms 34 have their ends 66 directed inwardly toward each other. Each of the transverse bars 60 and 62 have a plurality of small aperatures 68 formed therein. In like manner aperatures 70 are formed in the inwardly directed portions 66 of the arms 34. As is conventional, the hubs are connected to a source of vacuum which is communicated to the arms 34 and the transverse bars 60 and 62 and serve, on engagement of a sheet 24 deployed on the support 30, to firmly grasp and retain the sheet as it is transferred in an arcuate path to the stacking station 36.

FIG. 2A illustrates the relationship of a sheet 22 to the radially arms 34 and the interconnecting transverse bars 60 and 62. The areas at which the sheet is retained by the interconnected hollow arms and bars 34, 60 and 62 is illustrated. It will therefore be evident that a sheet is held along inclined areas 72 extending from the trailing edge 28, defining a transverse margin of the sheet, to the longitudinal margins LM. The transverse bars 60 and 62 grasp the sheet along transverse areas 74 one of which is adjacent to the leading margin 26 defining another transverse margin of the sheet 22. According to this arrangement each sheet 22 is engaged and retained at or near the transverse leading and trailing margins 26 and 28 and it should be appreciated that a variety of modifications are possible to the radial arms 34 and the transverse bar 60 and 62 to achieve firm and consistent engagement of sheets 22. For example, the arms 34 can be made so that their outer ends 66 are directed inwardly toward each other at 90 degrees or hollow blocks made integral with the arms 34 will achieve grasping of the sheet in the area of the trailing margin 28. It is also possible to eliminate one or both of the transverse bars 60 and 62 and substitute inwardly extending extensions connected to the source of vacuum and, between the extensions, provide a sheet supporting surface to fulfill the functions of the rods or screens 64. The sheet 22 shown in FIGS. 2A and 2B can be prepared by providing a hole punch on the bag machine to make a mounting hole or aperture 76 which is received by the post 38 at the stacking station 36. If desired, sheet 22 can be prepared without a mounting hole and impaled and stacked on a sharpened pin.

Figure 2B:
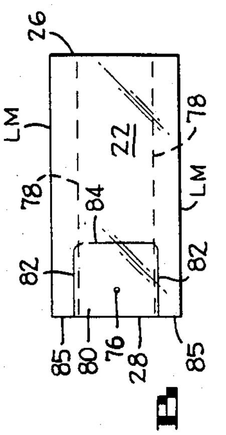
FIG. 2B is a web segment, such as shown in the vacuum arms in FIG. 2A.

FIG. 2B illustrates one configuration that the completed bag may take. Each sheet 22 is formed with inwardly extending gussets the inner edges of which are illustrated by the dotted lines 78. In presenting a stack of bags to a cutting apparatus a portion 80 is removed and it should be noted that the line of cut comprises lines 82 substantially parallel to the longitudinal margins LM on a line outwardly of the inner edges 78 of the gusset and a transverse line 84 interconnecting the lines 82. Accordingly, the completed bag includes hand grasping loops 85 which are usually large enough to receive the arm of a user. It is to be appreciated, however, that a variety of styles of bags and T-shirt bags can be produced. The more prominent variations are designed to unify a stack of bags such that individual bags can be removed from the stack by rupturing one or more bonds retaining them.

According to the present invention means 36 are provided for removing sheets from the grasp of the sheet transferring and stacking device 32 so that the individual bags or sheets assume a smooth surface configuration (free of wrinkles) and to retain stack registration by using only one pin or post 38 although it should be recognized that more than one pin or post or retaining means, such as a clamp, may be used. The means for achieving these objectives relate to the relationship of the sheet 22 to the radial arms 34 and the provisions of the transverse support roller 50 optionally combinable with the retaining fingers 54. Referring to FIG. 2A it will be seen that the longitudinal margins LM of the sheet 22 extend laterally inwardly from the parallel portions of the radial arms 34 and accordingly produce a gap or a slot or space 86. As a sheet carried in this manner reaches the stacking station 36 (FIGS. 2, 3 and 4) the pin or post 38 projects through the aperture 76 (FIG. 2B) and substantially concurrently the retaining fingers 54 enter the gap or space 86 confining the sheet against lateral movement between the fingers 54. The confining fingers 54 or equivalents thereto, constitute means to positively prevent the sheets from becoming disorganized since they could move about the pin 38. However, it is recognized that during accumulation and transfer of, stack registration is achieved without the need to provide confining means such as fingers 54. After the pin 38 projects through the aperature 76 and the longitudinal margins LM of the sheet are confined between the fingers 54, the sheet drapes over the transverse roller 50 while some degree of tension between the pin 38 and the roller 50 is imparted to the sheet due to the vacuum in the transverse bars 60 and 62. While the angle of approach of the arms 34 relative to the inclination of the stacking station would determine the sequence at which the sheet is released, it is preferred that release first occurs at the trailing margin 28 so that retention of the sheet by the transverse bars 60 and 62 has the effect of slightly tensioning the sheet before is it is fully draped over the roller 50.

FIG. 4 is an enlarged portion of the rightward pair of radial arms 34 shown in FIG. 2 which are at the stage of depositing a thermoplastic sheet 22 at the stacking station 36. Highlighted is the relationship of the retaining fingers 54 and the gaps or slots 86 between the arms 34 and the longitudinal margin LM of a sheet 22. Laying of successive sheets in a wrinkle-free condition by the residual grasping or retaining action of the transverse bars 60 and 62 is shown in FIG. 5 and it is illustrated at that instant of time where the mounting hole or aperture 76 has been penetrated by the post 38 while that portion of the sheet within the projected area of the transverse bars 60 and 62 is still firmly held. It should be noted that the longitudinal margin LM of the sheet is located between the retaining fingers 54 and that the retention of the sheet by the transverse bars 60 and 62 puts the sheet, as it is draped around the roller 50, in tension which is maintained until the radial arms rotate an additional amount stripping that portion of the sheet adjacent to the leading now trailing 26 from the lateral bars 60 and 62. Accordingly, the combined action of the post 38 and fingers 54 and retention of the sheet by the transverse bars 60 and 62 promote the creation of a wrinkle-free registered stack of sheets.

Figure 3:
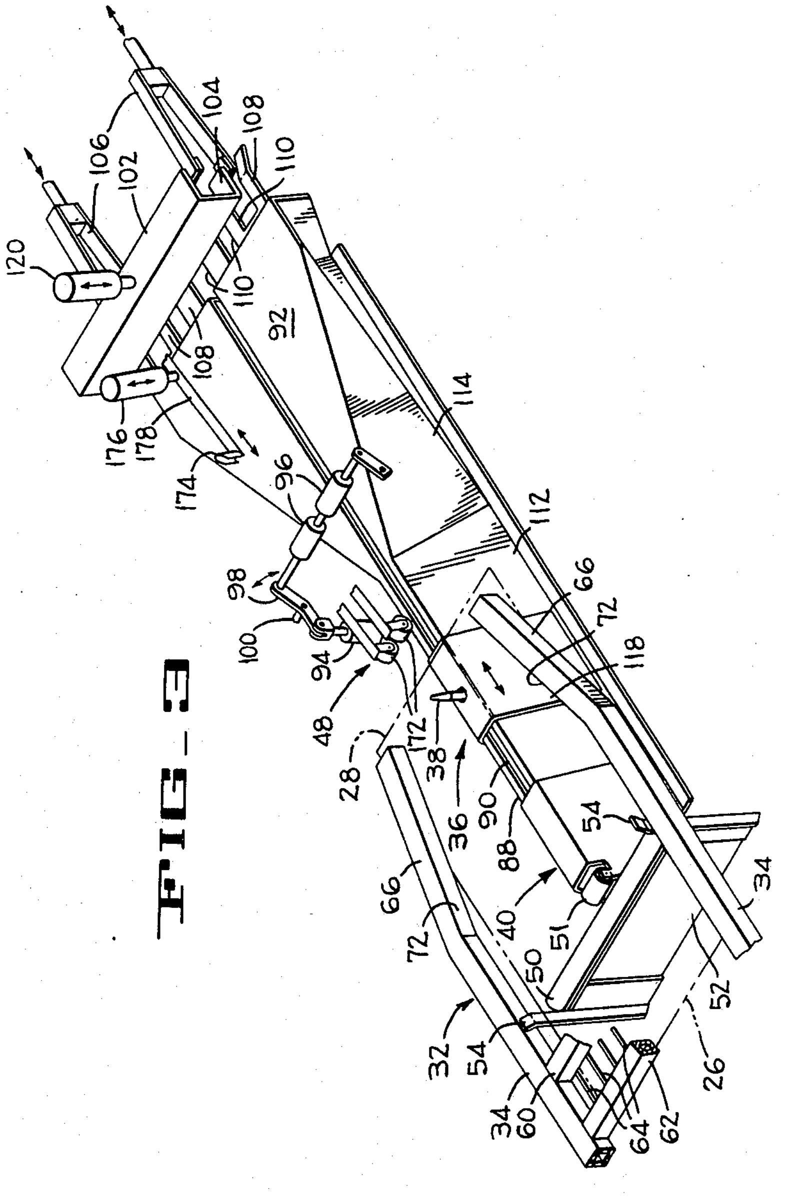
FIG. 3 is a perspective illustrating the rightward pair of vacuum arms shown in FIG. 2 placing a web segment on the stacking station and showing a clamping station for receiving a completed stack.

According to the present invention a transversing means 46 (FIGS. 1 and 7) are provided, and rendered operative upon the accumulation of a selected number of sheets in a stack, for transporting the stack from the stacking station 36. Concurrently operable, a temporary sheet retaining means 48 is temporarily positioned at the stacking station to accumulate sheets while the completed stack is displaced from the stacking station. (The preferred means for achieving these objectives are shown in FIGS. 1, 3, 7, 8, 9, 10, and 11.) In the course of moving a completed stack from the stacking station, means are also provided for stabilizing stack registration. As illustrated in FIG. 3 a stack of sheets is accumulated on an inverted U-shaped support 88 being formed with an elongate slot 90 being sufficiently wide to permit free movement of the pin or post 38 therein. The surface supporting a central portion of the stack of sheets diverges laterally outwardly to provide a generally triangular table 92 having a transverse width at least equal to the width of the sheet measured between the longitudinal margins LM. As the pin 38 carrying a completed stack is displaced toward the clamping device 44, stabilizing pressure rolls 96, while not necessary may be employed to the stack by actuating actuators 94 (only one being shown) to impart upward or downward motion to pressure rollers 96 through a bell crank 98 pivoted about a stationary pivot 100. It should be recognized that the rollers 96 are brought into contact with the stack after the trailing now leading margins 28 have progressed beyond the rollers 96. Accordingly stack registration may be maintained during movement of a stack by using rollers 96. The pin 38 moves the bag stack sufficiently longitudinally to place the leading edge of the now leading margins 28 under the clamping device 44 which essentially comprises a structural channel member 102 having its lower web 104 provided with clearance slots for freely receiving sets of opposed clamping fingers 106. A plurality of support fingers 108, defining an extension of the triangular table 92, are spaced to define slots 110 substantially congruent with the slots formed in the lower web 104 of the channel member 102. By this construction clamps 106, which may be carried by a reciprocable cross-head are positioned so that the fingers thereof may grip and clamp the leading edge of the now leading margins 28 of the stack and transport it for further processing which may include cutting apparatus for cutting out the portion 80 (FIG. 2B) along the lines 82 and 84 to produce the hand grasping loops or handles 85.

The inverted U-shaped support 88 is formed with inclined walls 112 being integral with laterally outwardly diverging walls 114 extending from the surface from the triangular table 92 downwardly toward mounting flanges 116. The configuration of the walls 114, in gradually diverging laterally outwardly, provide a camming surface for a flexible shroud or flap 118 connected to, and accordingly movable with, the pin or post 38 as a completed stack is translated toward the clamping device 44. The flap 118 may be made of leather or other suitable flexible material so that as it encounters the wall 114 it gradually flares outwardly and ensures that the sheet at the base of the stack is not torn or wrinkled as it makes the transition from the wall 112 to the wall 114 and eventually to the surface of the table 92. When a stack of sheets or bags has been transported to the clamping device 44 by the pin 38 the channel 102 is displaced downwardly by an actuator 120 compressing the leading edge of the now leading margins 28 of the stack. While compressed, the clamps 106 engage the stack and thereafter the actuator 120 is operated to raise the channel 102 prior to actuating or moving the clamps 106 to the right as viewed in FIG. 3. This sequence of events, of course, removes the stack from the table 92 which is then prepared to receive a subsequent stack.

In order to achieve uninterrupted stacking, and accordingly continuous operation of the bag machine 24, the temporary sheet retaining or preliminary accumulating means 46 is provided, which is operable to accumulate a number of web segments of a successive stack while the previously completed stack is in the process of being moved from the stacking station 36 to the clamping device 44. Such means are collectively identified by the numeral 48 and is best shown in FIGS. 1, 3, 7, 8, 9, 10 and 11. In the interests of clarity certain structural items of framework supporting certain operative components are not shown. It is believed that any suitable framework would be within the skill of the art. Referring first to FIG. 7, the means for accumulating a plurality of sheets while a completed stack is being displaced, comprises a beam or crosshead 124 having opposed ends rigidly clamped by suitable fasteners to a reach, in this instance the lower reach, of timing belts 126 and 128, wrapped around pulleys 130 and 134. The one pulley pair 130 is fixed to a transverse shaft 132. For purposes of this description one pulley pair will be referred to as the rear timing pulleys and the second pulley pair 134 as the front or forward timing pulleys. The front timing pulleys rotatably mounted on short stub shafts 136 carried by the support frame structure (not shown).

One end of te beam 124 is rigidly connected to the belt 128 by suitable fasteners 138 clamping the belt between blocks 140 and 142. Guide rolls 144, which may run on a guide channel, not shown, on the frame structure, not shown, contributes in supporting beam 124. The other end of the beam is clamped to the belt 126 by fasteners 146, clamping between overlying blocks 148 and 150, the lower reach of the belt 126. Rigidly connected to the lower surface of the block 150 is a block 152 having formed therein bores for slidably receiving guide rods 154 extending between and rigidly connected to plates 156 secured at opposed ends of a cable cylinder 158.

Figure 9:
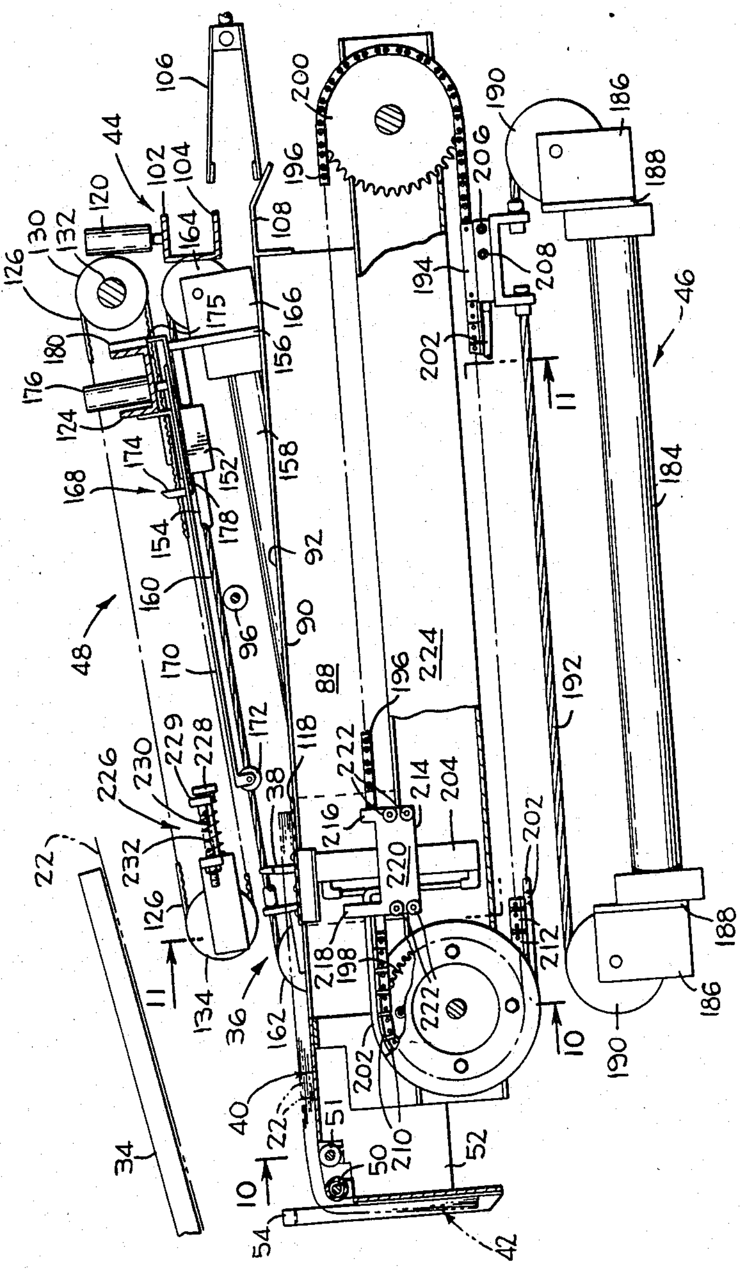
FIG. 9 is an enlarged elevation taken substantially along the line 9—9 of FIG. 2, disclosing a preferred construction of stack-accumulating and indexing means.
Figure 10:
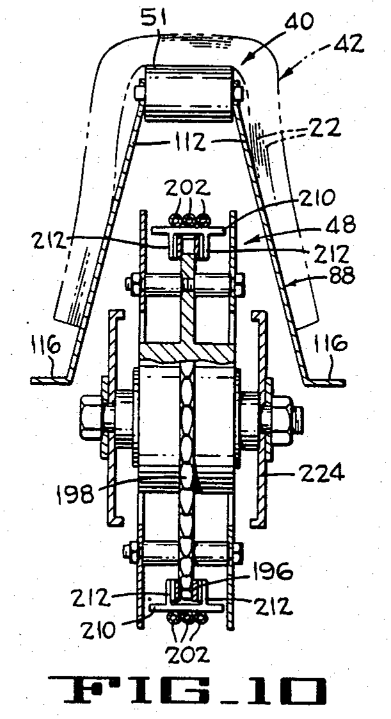
FIG. 10 is a section taken substantially along the offset cutting plane 10—10 of FIG. 9 illustrating the arrangement of supplying air under pressure to a reciprocating backing post or pin.
Figure 11:
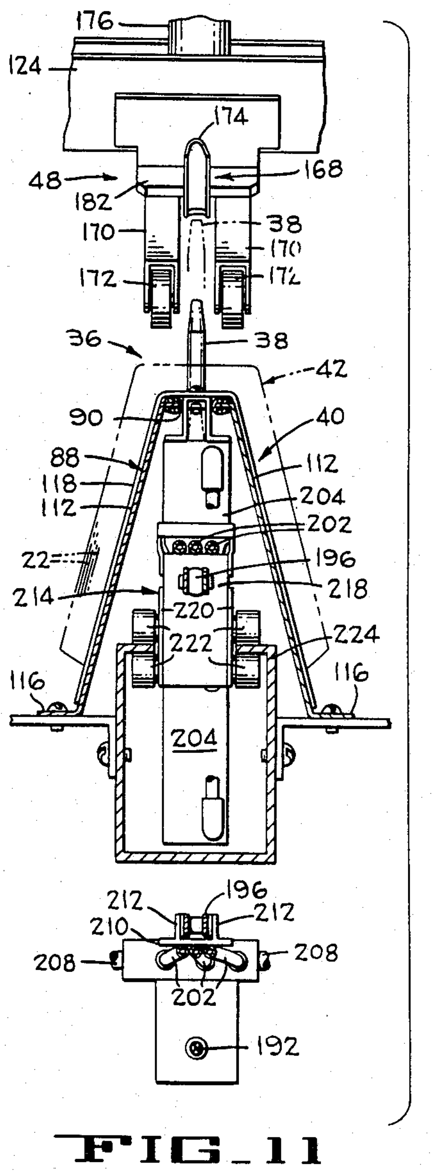
FIG. 11 is a section taken substantially along the offset plane 11—11 of FIG. 9 illustrating further details of the stacking station, including a provisional support provided with a temporary stacking pin.

. The cable cylinder 158 is connected to a source of fluid pressure, not shown. The piston, not shown, reciprocating therein is connected to and operates a cable 160 trained around front and rear cable pulleys 162 and 164 (FIG. 9). Each of the pulleys is rotatably mounted between plates 166 which are in turn secured to plates 156. The exposed reach of the cable 160 is rigidly fastened to the block 152 and accordingly actuation of the cable cylinder 158 transfers reciprocating motion, through the cable, to the beam or crosshead 124.

The above described construction operates to position, in synchronism with the sheet transferring and stacking device 20, accumulating means 168 for provisionally accumulating one or more sheets in preparation for and while a completed stack is being displaced toward the clamping device 44. The accumulating means 168 comprises elongate laterally spaced bars 170 supporting, at one end thereof, rollers 172. The opposed end of the bars 170 are rigidly attached to the crosshead 124 at 175 (FIG. 9).

A temporary stacking post or pin 174 is projectable, by an actuator 176, above and below the surface of the bars 170. More particularly, the stacking post 174 may take the illustrated preferred form of a semi-circular hollow post carried by a generally L-shaped beam 178 located between the bars 170. The short or rearward leg of the beam 178 is disposed between lateral guides 180 fixed to the rearward upstanding web of the beam 124 and is rigidly attached to the output rod of the actuator 176. On actuation of the actuator extending its rod, the beam 178 and the stacking post 174 carried thereby, are projected downwardly below a plane containing an upward surface of the bars 170. If desired a pad 182 may be secured to the upper surface of the bars 170 to provide a smooth surface supporting the sheets which are provisionally accumulated on the temporary stacking post 174.

As mentioned above, the post 38 is moveable in the slot 90 from the stacking station 36 to the clamping device 44 by a traversing or displacing mechanism 46 which also utilizes a cable cylinder 184 rotatably mounting, between plates 186 fixed to and projected from end plates 188, grooved sheaves 190 over which is trained a cable 192. Rigidly secured to the exposed reach of the cable 192, a manifold block 194 is pinned to and essentially forms a link of a sprocket chain 196 trained about a forward sprocket 198 and a rear sprocket 200. The manifold block 194 serves two principal functions; transferring the reciprocating motion of the cylinder 184 to the sprocket chain 196 and supplying air pressure to flexible conduits, collectively identified as 202, to an actuator 204 operating to position the stacking pin or post 38 in three distinct positions which are illustrated in FIG. 8.

With specific reference to FIG. 8, the three positions of the pin 38 are indicated as 38T, 38S and 38R meaning, respectively, the transfer position, the stacking position, and the retract position. The transfer position is shown by solid lines, whereas the stacking position and the retract position are shown in phantom outline. Also shown are the raised and retracted positions taken by the temporary stacking post 174. The full outline raised position is operative to accumulate one or more sheets at the stacking station. When the stacking post 38 is returned to the stacking station and assumes the position 38T, the temporary stacking post 174 is, by the action of the actuator 176 lowered it to the phantom outline position and then, by the action of the cable cylinder 158, is returned to the position shown in FIG. 7.

The manifold block 194 is formed with a plurality of fluid passageways connecting conduits 202 to a pressure and an exhaust line 206 and 208, respectively. Any suitable control logic may be used to connect or disconnect the line 206 to the source of pressure which is operative to deploy the post or stacking pin 38 in the selected positions shown in FIG. 8. To ensure that the conduits 202 remain relatively taut the conduits are disposed on flat top segments 210 having dependent ears 212 pinned to selevtive links of the chain 196 (FIG. 10) in order to establish a flat flexible surface extending from the vicinity of the actuator 204 to the manifold 194. The actuator 204 (FIGS. 7 and 11) is part of and is mounted within a carriage 214 taking the form of a generally rectangular box formed by a relatively thick block 216, mounting one end of the chain 196, and a block 218, mounting the other end of the chain. The boxlike carriage structure 214 is completed by side plates 220 (FIGS. 7 and 11) rigidly attached to the blocks 216 and 218 and mounting vertically spaced pairs of guide rollers 222. Guide rollers 222 engage an elongate box beam 224 guiding the carriage 214 from the stacking station to the region of the clamping device 44.

It should be appreciated that in order to fulfill the objective of continuous operation of the bag machine and accordingly supply a continuous stream of sheets for pickup and transfer by the device 20, the provisional accumulating means 48, positioning the temporary stacking post 174 in the region occupied by the stacking post 38, dictates rapid acceleration and deceleration of the cable cylinder 158. To absorb or dissipate the force resulting from the rapid acceleration of the temporary stacking pin 174 as it assumes a shrouded relationship to the stacking post 38 energy absorbing means 226 (FIG. 9) are provided. The preferred construction of such means comprises a pad 228 (FIG. 9) fixed to the end of a rod 230 which is surrounded by a spring 232. The rod 230 is slidably mounted in a bore formed in a block 234 secured to the overhead frame structure (not shown) supporting the temporary stack accumulating means 48. While one pad is shown it is to be recognized that two or more pads 228 may be provided. The pad is contacted by the beam or crosshead 124 as the post 174 arrives at the post 38. To maintain the proper shrouding relationship between the post 174 and the post 38, the absorbing means 226 may be provided with an adjustable stop 229. Contact pressure between the pad 228 and the crosshead 124 is maintained by pressure in cylinder 158. The shrouding relationship of the post 174 and the post 38 is shown in FIG. 8 where it will be observed that several sheets 22 have been placed on the post 174 during the course of translating the completed stack carried by pin 38 to the clamping device 44 and return of the pin to its normal stack accumulating position. In this regard, and with respect to FIG. 8, the actuator 204 controls the projection of the pin 38 to effect transfer of the sheets 22 from the temporary stacking post 174 to the stacking post 38, its projection during accumulation of additional sheets to define a stack and its projection during excursion of the carriage 216 from the clamping device 44 to the stacking position. More particularly when a selected number of sheets have been accumulated on the pin 38, cable cylinder 158 is actuated rapidly displacing the beam 124 and the bars 170 carried thereby in the orbit of the sheets being transferred and such movement is arrested when the pin 174 arrives at a position to accumulate one or more sheets of the next stack. In moving forward or toward the stacking station 36, the rollers 172 encounter and roll on the uppermost sheet of a completed stack. The pin 38 at this time is in the position 38S and the stack accumulated thereon is translated toward the clamping device 44. Once the leading edge of the stack has been clamped, actuator 204 retracts the pin to the position 38R and maintains it in this position until the cable cylinder 184 returns the carriage 216 to the stacking station 36. During this interval of time several sheets may have been stacked on the post 174. To transfer the sheets from the post 174 to the pin 38, the actuator 204 projects the pin upwardly to the position 38T and it penetrates through the hole 76 of the sheets. At this time actuator 176 is energized moving the post 174 downwardly, as shown in phantom outline in FIG. 8, promptly thereafter cable cylinder 158 is actuated to translate the beam 124 rearwardly away from the stacking station 36. The actuator 204 is again operated to move the pin 38 to the position 38S which is the normal position assumed.

Figure 12A:
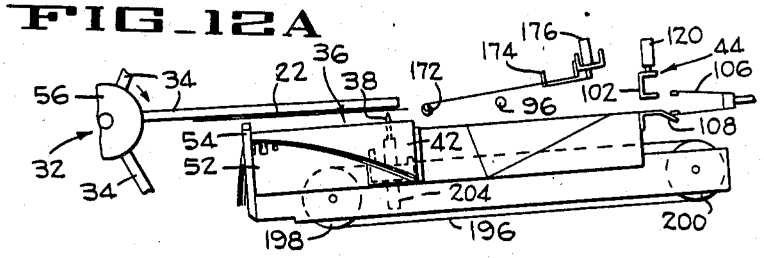
FIGS. 12A-12J progressively illustrate transfer of a completed stack accumulation at the stacking station of a number of web segments while a completed stack is being transferred by the stacking post or pin to a stack removing mechanism which preferably comprises a plurality of clamps.
Figure 12B:
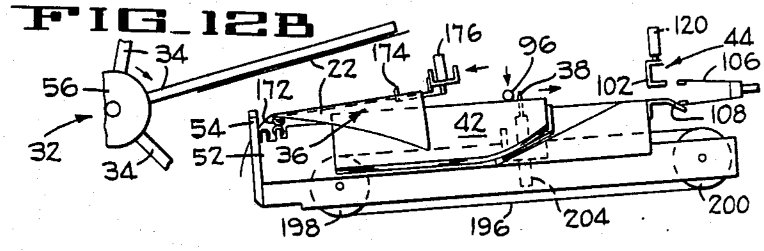
Figure 12C:
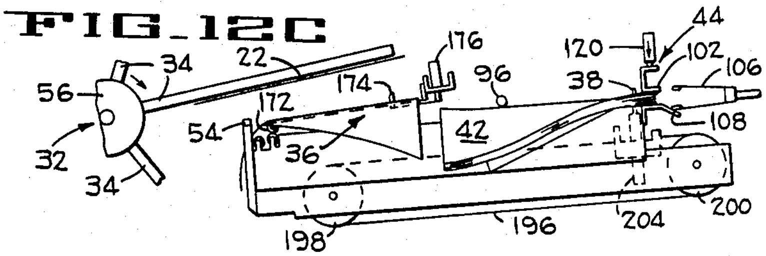
Figure 12D:
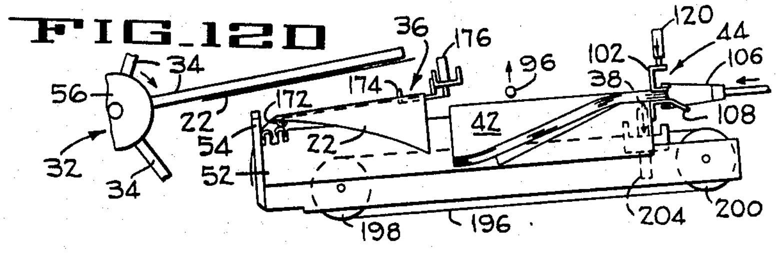
Figure 12E:
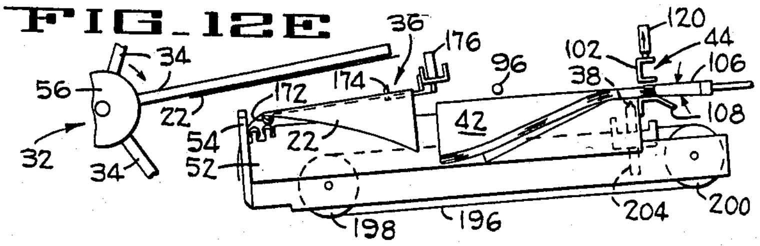
Figure 12F:
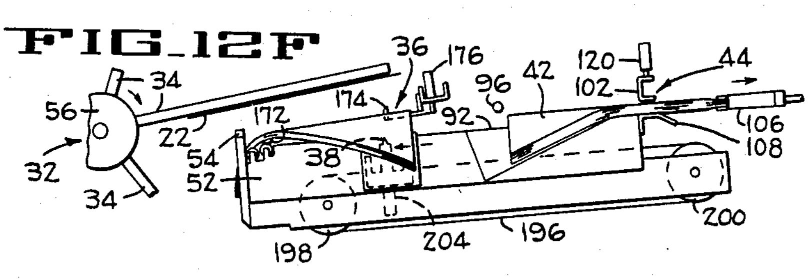
Figure 12G:
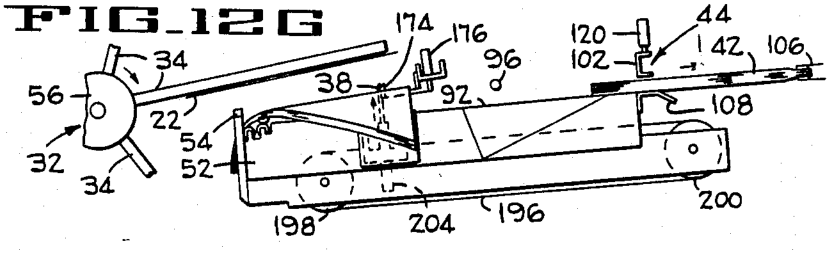
Figure 12H:
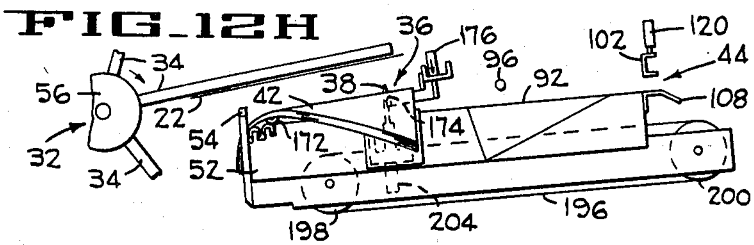
Figure 12I:
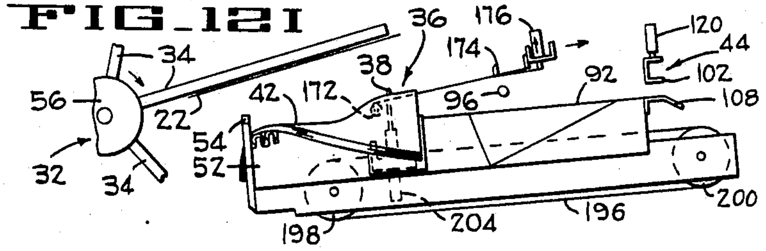
Figure 12J:
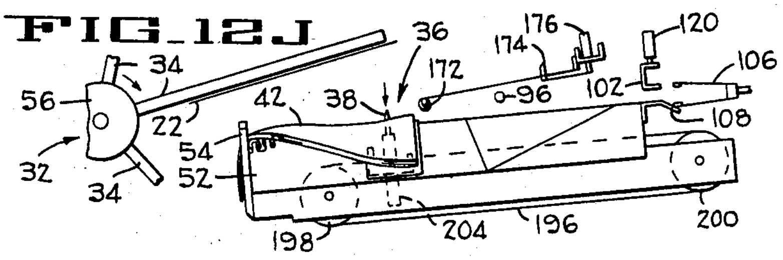

The overall operation of the above described apparatus will be desbcribed in connection with the sequential diagrammatic illustrations of FIGS. 12A–12J. FIG. 12A illustrates the situation where the sheet 22 retained by the arms 34 will be the last sheet of a completed stack S. As soon as the sheet has been stacked, the rods 170, constituting the temporary stacking table, are rapidly projected in the stacking position whereby the successive bag or sheet is supported thereby on the post 174. Substantially concurrently the cable cylinder 184, operating the chain 196, is actuated moving the completed stack toward the clamping device 44. As the stack S is being displaced, actuators 94 (FIG. 3) operate to bring rollers 96 in contact with the stack and thus restrain tendencies causing movement of the sheets 22 about the post 38. Additionally an idler roller 51 underlies rollers 172 when rods 170 are positioned to stack the initial sheets of a stack. On moving a completed stack, the roller 51 provides a moving surface that promotes free movement of the stack. As the leading edge of the bag stack arrives at the clamping station 44, the channel 102 is displaced downwardly by the actuator 120 compressing the leading edge of the stack against the support fingers 108 (FIG. 12D) and the clamps 106, while spread, are moved toward and clamp the stack (FIG. 12E) to effect removal thereof from the table 92. As soon as the leading edge of the stack is clamped by the channel 102, the actuator 204 is operated to retract the pin 38 to the position 38R (FIG. 8) and the pressure rollers 96 are raised since control of the stack has been transferred to the clamps 106. During these events sheets 22 continue to be collected and stacked on the post 174. The clamps 106, after having a firm grip on the bag stack, are displaced by suitable means such as an actuator (not shown) removing the stack from, the table 92. In the course of removing the stack from the table 92, the carriage 214 mounting the actuator 204 is displaced to the stacking station 36 whereupon the post 38 is projected to position 38T (FIG. 8) which effectively transfers retention of the stack from the post 174 to the pin 38 (FIG. 12G). Promptly thereafter actuator 176 is operated lowering the post 174 sufficiently to be free of the stack and thereafter the cable cylinder 158 returns the temporary stacking means 122 to its original position as shown in FIG. 12J. The sequence is completed when the stacking post 38 is returned to position 38S shown in FIG. 8.

Although the best mode contemplated for carrying out the present invention has been herein shown and described, it will be apparent that modification and variation may be made without departing from what is regarded to be the subject matter of the invention.

What is claimed is:

1. A method of placing a sheet displaced in a substantially planar condition on a pin penetrating the sheet adjacent one of its margins, comprising the steps of:

releasably grasping the sheet on opposite sides and in or adjacent a transverse zone containing the point of pin penetration, releasably grasping the sheet in a transverse zone spaced from said first mentioned zone, placing the sheet between retainers located between said transverse zones to prevent movement of the sheet around the pin, successively releasing the sheet from the grasping zones by first releasing the sheet in the first mentioned transverse zone while maintaining the grasping of the sheet in the second mentioned transverse zone during positioning of the sheet between the retainers thereby effecting the tensioning of the sheet between the pin and a support extending between the retainers, and releasing the tensioned sheet from the second mentioned transverse zone onto the support.

* * * * *